Patented July 28, 1925.

1,547,365

UNITED STATES PATENT OFFICE.

IRA JUDSON COE, OF OAKLAND, CALIFORNIA.

MANUFACTURE OF WHITE HYDRAULIC CEMENT.

No Drawing.    Application filed September 4, 1923. Serial No. 660,935.

*To all whom it may concern:*

Be it known that I, IRA JUDSON COE, a citizen of the United States, residing at Oakland, in the county of Alameda and State of California, have invented certain new and useful Improvements in the Manufacture of White Hydraulic Cement, of which the following is a specification.

My invention relates to the manufacture of hydraulic cement particularly of the Portland type. It consists both in novel method of manufacturing a white hydraulic cement and in the novel white hydraulic cement as the product of said method, as I shall herein fully describe. My invention is based essentially upon two considerations. One is that iron is not a necessary ingredient in the manufacture or composition of a cement of this type. The other is that according to my method and the materials used it is not necessary to employ any material foreign to the mix, to act as a flux in the burning. As a result of these considerations my invention comprises the use of the mineral labradorite, a triple silicate of lime, sodium and aluminum, of a kind essentially or approximately free from iron, and white in color, as one of the ingredients of the mix, instead of the usual clay material commonly employed in the manufacture of hydraulic cement; and the use, as the only other ingredient, of a limestone essentially or approximately free from iron. In this specification and claims, for the sake of brevity, I shall use the term "iron free" with respect to both ingredients, with the understanding that there may be and usually is a negligible proportion of iron in both the labradorite and limestone, but this does not materially affect the method or the white product.

In carrying out my invention I mix a proper proportion of iron-free limestone and iron-free labradorite in finely ground condition, and I sinter this mixture in the usual manner pursued in the manufacture of Portland cement. I find that the alkali sodium is volatilized in this sintering and passes off as a fume, while the labradorite before it becomes hot enough to expel its soduim content, acts of itself as a flux to bring into proper intimate contact the ingredients of the mix so that they may chemically react.

I prefer to use a mixture containing 75 per cent of limestone and 25 per cent of labradorite. These proportions may, however, vary with the varying chemical analysis of the labradorite and the limestone, but the mix should be such that with the elimination of carbonic acid gas and the sodium oxide of the mix, there will remain calcium oxide, aluminum oxide and silican oxide in the usual proportion of cement of this type. By sintering this iron-free mixture and pulverizing the resultant clinker, I produce a perfectly white hydraulic cement, which has all the qualities of the usual gray Portland cement.

I claim:

1. The method of making white hydraulic cement, comprising sintering mixture of iron-free labradorite and iron-free limestone.

2. A white hydraulic cement consisting of the sinter and ground mix of an iron-free limestone and an iron-free labradorite.

In testimony whereof I have signed my name to this specification,

IRA JUDSON COE.